United States Patent
Wu et al.

(10) Patent No.: US 8,539,462 B2
(45) Date of Patent: Sep. 17, 2013

(54) METHOD FOR ALLOCATING REGISTERS FOR A PROCESSOR BASED ON CYCLE INFORMATION

(75) Inventors: Chung Ju Wu, Taipei (TW); Yu Te Lin, Kaohsiung County (TW); Jenq Kuen Lee, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 387 days.

(21) Appl. No.: 12/974,291

(22) Filed: Dec. 21, 2010

(65) Prior Publication Data

US 2012/0159110 A1  Jun. 21, 2012

(51) Int. Cl.
  *G06F 9/45* (2006.01)
(52) U.S. Cl.
  USPC ........... 717/144; 717/140; 717/141; 717/142; 717/143
(58) Field of Classification Search
  USPC .......... 717/140–144; 707/713–721, 790–812
  See application file for complete search history.

(56) References Cited

U.S. PATENT DOCUMENTS

| | | | | |
|---|---|---|---|---|
| 5,428,810 | A * | 6/1995 | Barkans et al. | 712/42 |
| 6,718,541 | B2 * | 4/2004 | Ostanevich et al. | 717/149 |
| 7,007,271 | B2 * | 2/2006 | Kumar et al. | 717/151 |
| 7,062,762 | B2 * | 6/2006 | Krishnamurthy et al. | 717/156 |
| 7,650,598 | B2 | 1/2010 | Lee et al. | |
| 7,761,691 | B2 * | 7/2010 | Tang et al. | 712/217 |
| 8,200,944 | B2 * | 6/2012 | Lee et al. | 712/216 |
| 2008/0052694 | A1 * | 2/2008 | Lee et al. | 717/151 |
| 2010/0037037 | A1 * | 2/2010 | Lee et al. | 712/205 |

OTHER PUBLICATIONS

Chen et al., Enabling Compiler Flow for Embedded VLIW DSP Processors with Distributed Register Files, LCTES '07 Proceedings of the 2007 ACM SIGPLAN/SIGBED Conference on Languages, Compilers and Tools for Embedded Systems, pp. 146-148, Jul. 2007.*
Berson et al., Integrated Instruction Scheduling and Register Allocation Techniques, in Proc. of the Eleventh International Workshop on Languages and Compilers for Parallel Computing, LNCS, pp. 247-262, 1998.*

* cited by examiner

*Primary Examiner* — Wei Zhen
*Assistant Examiner* — Andrew M Lyons
(74) *Attorney, Agent, or Firm* — WPAT, P.C.; Anthony King

(57) ABSTRACT

A method of allocating registers for a processor based on cycle information is disclosed. The processor comprises a first cluster and a second cluster. Each cluster comprises a first functional unit, a second functional unit, a first local register file connected to the first functional unit, a second local register file connected to the second register file, and a global register file having a ping-pong structure formed by a first register bank and a second register bank. After building a Component/Register Type Associated Data Dependency Graph (CRTA-DDG), a functional unit assignment, register file assignment, ping-pong register bank assignment, and cluster assignment are performed to take full advantage of the properties of a processor as well as cycle information.

13 Claims, 15 Drawing Sheets

METHOD FOR ALLOCATING REGISTERS FOR A PROCESSOR BASED ON CYCLE INFORMATION

BACKGROUND OF THE INVENTION

1. Field of the Invention

The present invention relates to a method for allocating registers for a processor, and more particularly, to a method for allocating registers for a Parallel Architecture Core (PAC) processor.

2. Description of the Related Art

Instruction-level parallelism (ILP) is increasingly deployed in high-performance digital signal processors (DSPs) with very long instruction word (VLIW) data-path architectures. Such DSPs usually have multiple functional units, and the number of read/write ports connecting register files increases with the number of functional units. The distributed register-file design is being adopted to reduce the amount of read/write ports in registers. The distributed register-file design includes features such as multi-cluster register files, multiple banks, and limited temporal connectivities such as ping-pong architectures. These architectures have been shown to be able to reduce the numbers of read/write ports in registers and reduce power consumption while sustaining high ILP in VLIW architectures.

FIG. 1 illustrates the architecture of a PAC processor utilizing a ping-pong architecture. The PAC processor 10 comprises a first cluster 12A and a second cluster 12B, wherein each cluster 12A and 12B comprises a first functional unit 20, a second functional unit 30, a first local register file 14 connected to the first functional unit 20, a second local register file 16 connected to the second functional unit 30, and a global register file 22 having a ping-pong structure formed by a first register bank B1 and a second register bank B2. Each register file includes a plurality of registers. Also, the PAC processor 10 comprises a third functional unit 40, which is placed independent of and outside the first cluster 12A and the second cluster 12B. A third local register file 18 is connected to the third functional unit 40. The first functional unit 20 is a load/store unit (M-Unit), the second functional unit 30 is an arithmetic unit (I-Unit), and the third functional unit 40 is a scalar unit (B-unit). The third functional unit 40 is in charge of branch operations and also capable of performing simple load/store and address arithmetic. The global register files 22 are used to communicate across clusters 12A and 12B; only the third functional unit 40, being able to access all global register files 22, is capable of executing such copy operations across clusters 12A and 12B. The first local register file 14, the second local register file 16, and the third local register file 18 are only accessible by the M-Unit 20, I-Unit 30, and B-Unit 40, respectively. Each global register file 22 has only a single set of access ports, shared by the M-Unit 20 and I-Unit 30. Each register bank B1 or B2 of the global register file 22 can only be accessed by either the first functional unit 20 or the second functional unit 30 in an operation cycle, so these two functional units 20, 30 can only access different banks B1 or B2 in each operation cycle. This is an access constraint of the ping-pong structure.

The presence of distributed register-file architectures featuring multi-bank register files, distributed register clusters, and limited temporal connectivities in embedded VLIW DSPs presents challenges for compilers attempting to generate efficient codes for multimedia applications. Research on compiler optimizations to address this issue first addressed issues related to cluster-based architectures. This includes partitioning register files to work with instruction scheduling, and loop partitions for clustered register files. To address more general issues dealing with multi-bank register files, distributed register clusters, and ping-pong architecture on embedded VLIW DSPs, Lee et al. (U.S. Pat. No. 7,650,598B2) provided a pioneering ping-pong-aware local-favorable (PALF) scheme, which uses a local-favorable method for bank assignments that applies graph partitioning for assigning multi-bank and multi-cluster register files. This scheme first performs partitioning, followed by register allocation and instruction scheduling phases.

However, the method provided by Lee et al. does not take the cycle information of the instructions into account. As a result, the register allocation provided accordingly often fails to reach a preferable result. Therefore, the present invention provides an improved method for allocating registers for a PAC processor utilizing the ping-pong architecture that achieves a better solution compared to the prior art method.

SUMMARY OF THE INVENTION

The objective of the present invention is to provide a method for allocating registers for a PAC processor with multiple register files and access constraints based on cycle information.

The PAC processor according to one embodiment of the present invention comprises a first cluster and a second cluster. Each cluster comprises a first functional unit, a second functional unit, a first local register file connected to the first functional unit, a second local register file connected to the second functional unit, and a global register file having a ping-pong structure formed by a first register bank and a second register bank. The global register file comprises a single set of access ports shared by the first and second functional units.

The method for allocating registers for a processor based on cycle information according to one embodiment of the present invention comprises the steps of: obtaining cycle information indicating latency dependencies of a plurality of instructions; building a graph comprising nodes, circles and edges, wherein each node represents an instruction and is either unallocated or is allocated to the first functional unit or the second functional unit, each circle is attached to a node and represents an operand or the result of an instruction, and each edge is connected between two of the circles, indicating data dependency therebetween; allocating one of the first and second functional units to the unallocated nodes in the graph according to the nodes already allocated in the path containing the nodes to be allocated and the cycle information; allocating the first, second and global register files to the circles representing the result of an instruction based on the circles connected to the circles to be allocated and the data dependency therebetween; allocating the first register bank and the second register bank to the circles allocated to the global register file according to the data dependency therebetween and the cycle information; partitioning the nodes allocated to the first functional unit and the second functional unit into a first group assigned to the first cluster and a second group assigned to the second cluster based on the cycle information; and adding at least one node to communicate between the first cluster and the second cluster or between the global register file and the first and second local register files.

The foregoing has outlined rather broadly the features and technical advantages of the present invention in order that the detailed description of the invention that follows may be better understood. Additional features and advantages of the invention will be described hereinafter, and form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims

BRIEF DESCRIPTION OF THE DRAWINGS

The objectives and advantages of the present invention will become apparent upon reading the following description and upon referring to the accompanying drawings of which.

DETAILED DESCRIPTION OF THE INVENTION

Figure 1:
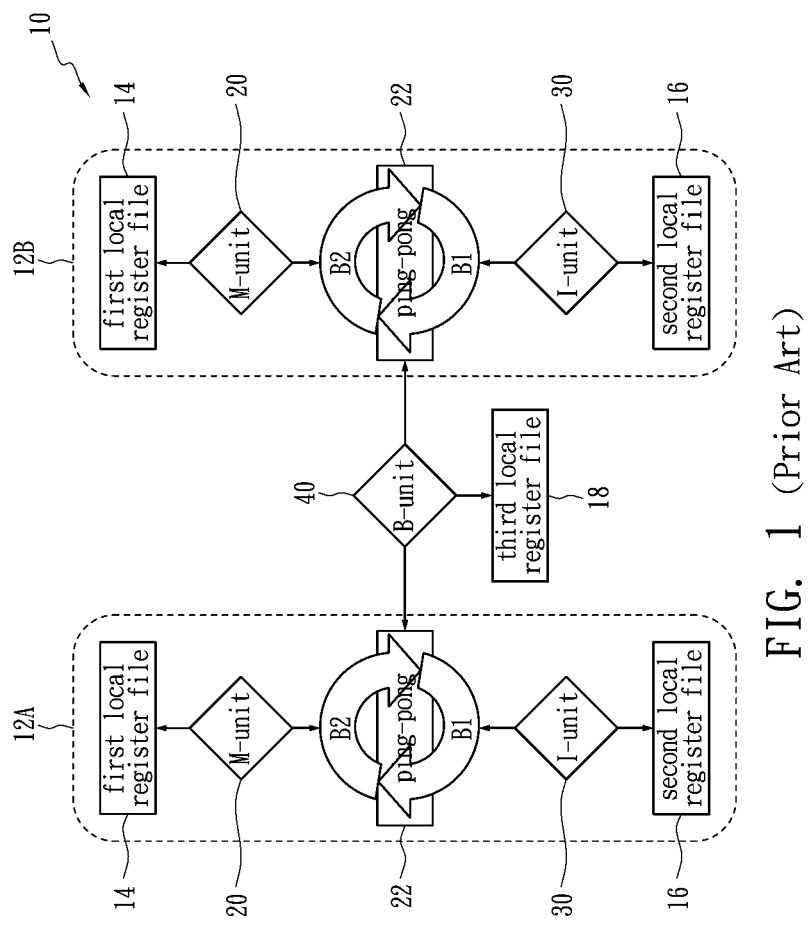
FIG. 1 illustrates the architecture of a PAC processor utilizing the ping-pong architecture.
Figure 2:
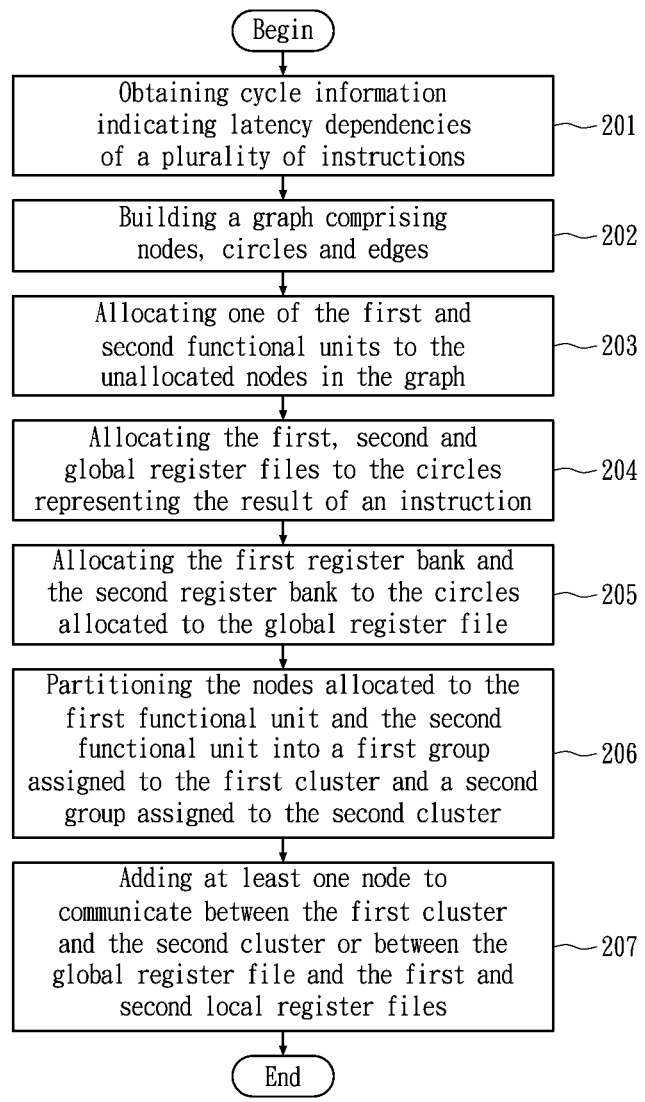
FIG. 2 shows a flow chart of the method for allocating registers for a processor based on cycle information according to an embodiment of the present invention.

FIG. 2 shows a flow chart of the method for allocating registers for a processor based on cycle information according to an embodiment of the present invention. The method shown in FIG. 2 is applicable to the PAC processor shown in FIG. 1. In step 201, cycle information indicating latency dependencies of a plurality of instructions is obtained, and step 202 is executed. In step 202, a graph comprising nodes, circles and edge is built, wherein each node represents an instruction and is either unallocated or is allocated to the first functional unit or the second functional unit, each circle is attached to a node and represents an operand or the result of an instruction, and each edge is connected between two of the circles, indicating data dependency therebetween, and step 203 is executed. In step 203, all of the unallocated nodes in the graph are allocated to one of the first and second functional units according to the nodes already allocated in the path containing the nodes to be allocated and the cycle information, and step 204 is executed. In step 204, all of the circles representing the result of an instruction are allocated to the first, second and global register files based on the circles connected to the circles to be allocated and the data dependency therebetween, and step 205 is executed. In step 205, all of the circles allocated to the global register file are allocated to the first register bank and the second register bank according to the data dependency therebetween and the cycle information, and step 206 is executed. In step 206, all of the nodes allocated to the first and the second functional units are partitioned into a first group assigned to the first cluster and a second group assigned to the second cluster based on the cycle information, and step 207 is executed. In step 207, at least one node is added to communicate between the first cluster and the second cluster or between the global register file and the first and second local register files.

Figure 3:
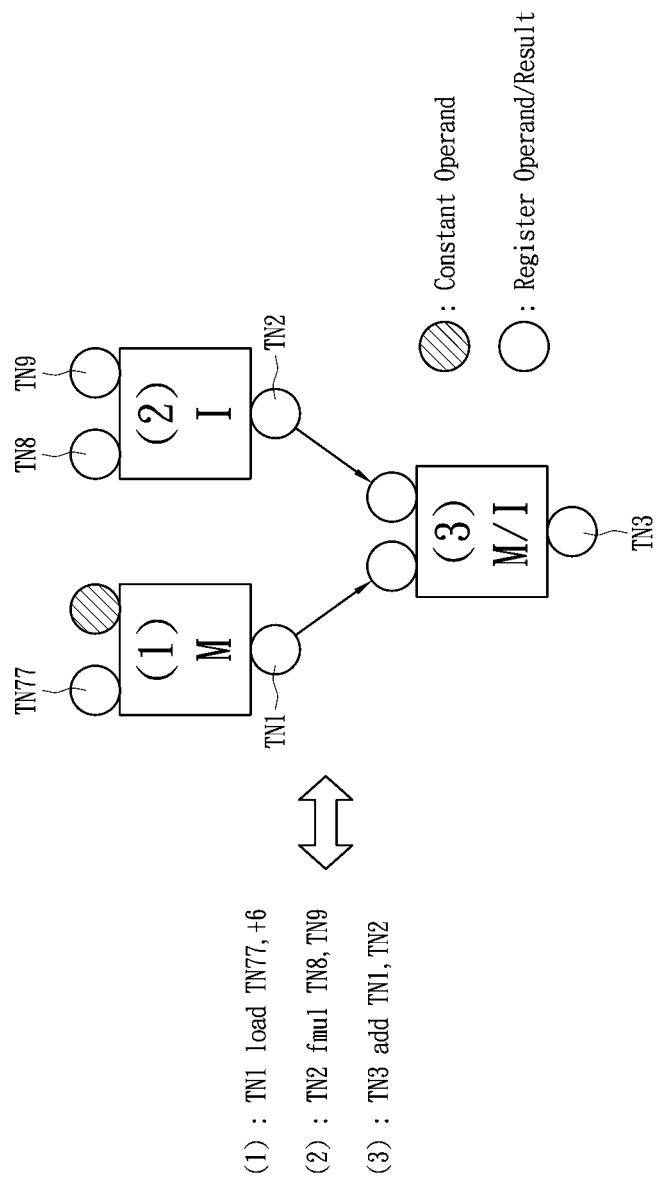
FIG. 3 shows an example of a code sequence of a plurality of instructions and the corresponding Component/Register Type Associated Data Dependency Graph (CRTA-DDG) according to an embodiment of the present invention.

The following illustrates an example of applying the method for allocating registers for a processor based on cycle information shown in FIG. 2 to the PAC processor shown in FIG. 1. In step 201, a pseudo instruction scheduling operation is performed to obtain the cycle information for a plurality of instructions. In step 202, a graph called component/register type associated data dependency graph (CRTA-DDG) is constructed for constraint analysis by preserving information on the execution and storage relationship. FIG. 3 shows an example of a code sequence of the plurality of instructions and the corresponding CRTA-DDG. As shown in FIG. 3, the temporary names (TNs) represent pseudo registers of instructions that need to be allocated to registers in a later compiling phase. In addition, each node represents an instruction and is either unallocated or is allocated to the first functional unit or the second functional unit, each circle is attached to a node and represents an operand or the result of an instruction, and each edge is connected between two of the circles, indicating data dependency therebetween.

Figure 4:
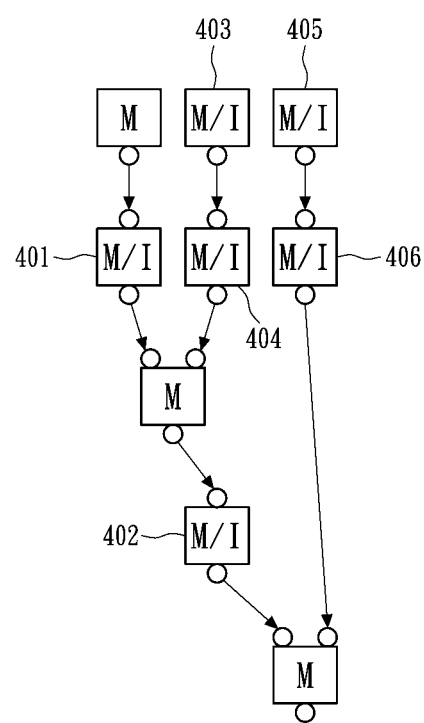
FIG. 4 shows an example of a CRTA-DDG according to an embodiment of the present invention.
Figure 5:
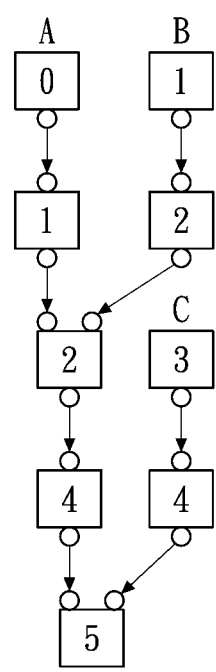
FIG. 5 shows paths found according to a CRTA-DDG according to an embodiment of the present invention.

In step 203, all of the unallocated nodes in the graph are first allocated to either the first or the second functional unit. The following describes in detail the operation of step 203. FIG. 4 shows an example of a CRTA-DDG. First, a maximal path either containing the nodes allocated to the first functional unit and the unallocated nodes, or containing the nodes allocated to the second functional unit and the unallocated nodes, or containing only the unallocated nodes, is found. Then the nodes contained in the found maximal path from the graph are removed from the CRTA-DDG. The above procedure is repeated until the CRTA-DDG contains no nodes. FIG. 5 shows the paths found according to the CRTA-DDG shown in FIG. 4. As shown in FIG. 5, there are a total of three paths: A, B, and C, wherein as shown in FIG. 5, the execution cycle of each node is also shown in the CRTA-DDG. Then, if a path contains a node allocated to the first functional unit, the unallocated nodes in the path are allocated to the first functional units. Likewise, if a path contains a node allocated to the second functional unit, the unallocated nodes in the path are allocated to the second functional units. Further, for a path containing only the unallocated nodes, if the execution cycles of the nodes to be allocated overlap less with the execution cycles of the nodes allocated to the first functional units, these unallocated nodes are allocated to the first functional units. Likewise, for a path containing only the unallocated nodes, if the execution cycles of the nodes to be allocated overlap less with the execution cycles of the nodes allocated to the second functional units, these unallocated nodes are allocated to the second functional units. In addition, for a path containing only the unallocated nodes, if the overlap of the execution cycles of the nodes to be allocated between the nodes to be allocated and the nodes allocated to the first functional units and the overlaps of the execution cycles of the nodes to be allocated between the nodes to be allocated and the nodes allocated to the second functional units is even, these unallocated nodes as a whole are allocated to the first functional units and the second functional units alternately. That is, if the paths of which the nodes are allocated to the second functional units are not fewer than the paths of which the nodes are allocated to the first functional units, these unallocated nodes are allocated to the first functional units. Also, if the paths of which the nodes are allocated to the second functional units are fewer than the paths of which the nodes are allocated to the first functional units, these unallocated nodes are allocated to the second functional units.

Figure 6:
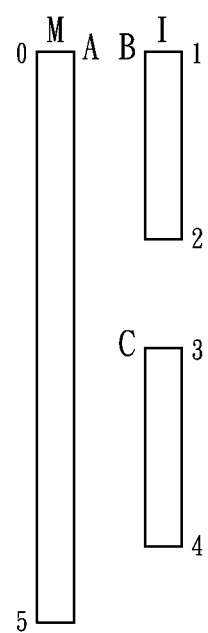
FIG. 6 shows an allocation result of a CRTA-DDG according to an embodiment of the present invention.

Referring to FIG. 4, it can be seen that the path A contains the nodes allocated to the M-unit. Accordingly, the unallocated nodes 401 and 402 are also allocated to the M-unit. In addition, both the paths B and C contain only the unallocated nodes, and therefore, the nodes 403 and 404 are both allocated to either the M-unit or the I-unit, and nodes 405 and 406 are both allocated to either the M-unit or the I-unit. Referring to FIG. 5, it can be seen that the execution cycles of nodes 403 and 404 overlap with the nodes 401 and 402. Accordingly, the nodes 403 and 404 are both allocated to the I-unit. Likewise, the nodes 405 and 406 are also both allocated to the I-unit. FIG. 6 shows the allocation result of the CRTA-DDG shown in FIG. 4: the nodes in path A are allocated to the M-unit, and the nodes in paths B and C are allocated to the I-unit. When applying the prior art method, the nodes in paths A and C may all be allocated to the M-unit, and the nodes in path B may be allocated to the I-unit, and therefore an overlap of execution cycle occurs. However, by applying the method in this embodiment, which further takes cycle information into account, the aforementioned overlap of execution cycle is avoided.

Figure 7:
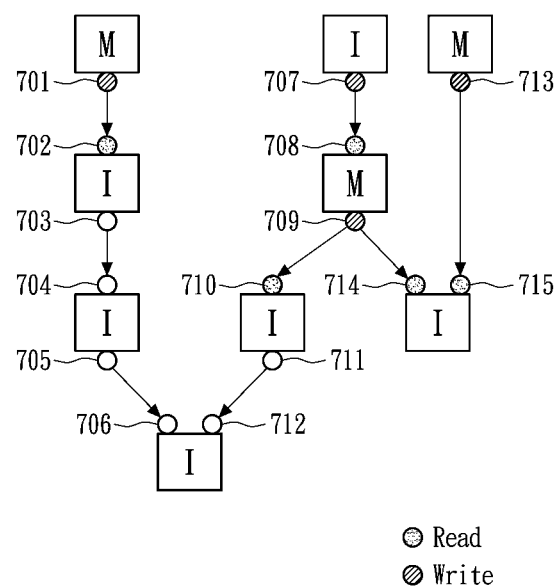
FIG. 7 shows an example of a CRTA-DDG according to another embodiment of the present invention.

In step 204, all of the circles representing the result of an instruction are allocated to the first, second and global register files. The following describes in detail the operation of step 204. FIG. 7 shows another example of a CRTA-DDG. As shown in FIG. 7, all of the nodes are already allocated to either the M-unit or the I-unit. First, each pair of the unallocated circles which are connected by an edge and are both attached to a node allocated to the first functional unit are allocated to the first local register file. Second, each pair of the unallocated circles which are connected by an edge and are both attached to a node allocated to the second functional unit are allocated to the second local register file. Third, each pair of the unallocated circles which are connected by an edge and are respectively attached to a node allocated to the first functional unit and a node allocated to the second functional unit are allocated to the global register file.

Referring to FIG. 7, the pair of the circles 703 and 704 are linked together and are both attached to a node allocated to the I-unit. Accordingly, both of the circles 703 and 704 are allocated to the second local register file. Likewise, the pair of circles 705 and 706 and the pair of circles 711 and 712 are all allocated to the second local register file. On the other hand, the pair of the circles 701 and 702 are linked together but are respectively attached to a node allocated to the M-unit and a node allocated to the I-unit. Accordingly, both of the circles 701 and 702 are allocated to the global register file. Likewise, the pair of circles 707 and 708, the pair of circles 709 and 710, the pair of circles 709 and 714 and the pair of circles 713 and 715 are all allocated to the global register file.

In some embodiments of the present invention, a processor which comprises a third functional unit connected between the first cluster and the second cluster and a third local register file connected to the third functional unit may be applied, such as the PAC processor shown in FIG. 1. For such processor, a step of allocating the third local register file to each unallocated circles attached to a node allocated to the third functional unit may be included in the method for allocating registers for a processor based on cycle information provided by the present invention.

In step 205, all of the circles allocated to the global register file are allocated to the first register bank and the second register bank. The following describes in detail the operation of step 205. First, the nodes, circles and edges from the graph other than the global circles, which are the circles allocated to the global register file, the nodes these circles global attached to, and the edges connecting these global circles are removed. Second, a node-splitting operation for read and write operations in the same nodes are performed to obtain a plurality of sub-graphs. Third, an interference graph indicating data dependency and the overlaps of the execution cycles between each node is built according to the plurality of sub-graphs and the cycle information. Fourth, the first register bank and the second register bank are allocated to the circles of the plurality of sub-graphs according to the interference graph to avoid interference between the first register bank and the second register bank.

Figure 8:
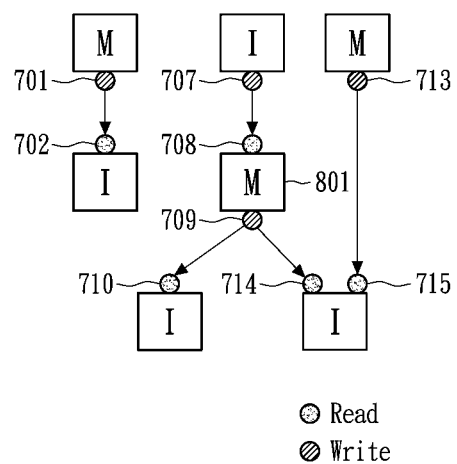
FIG. 8 shows an example of a CRTA-DDG according to another embodiment of the present invention.
Figure 9:
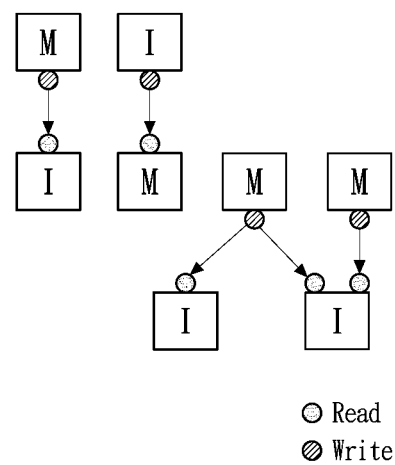
FIG. 9 shows an example of a CRTA-DDG according to another embodiment of the present invention.
Figure 10:
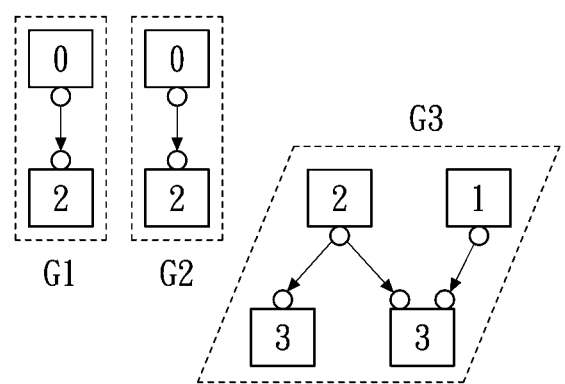
FIG. 10 shows an example of a CRTA-DDG according to another embodiment of the present invention.
Figure 11:
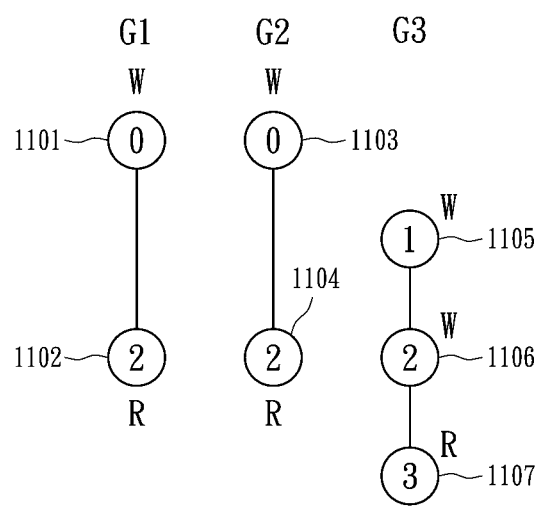
FIG. 11 shows an example of an interference graph according to an embodiment of the present invention.
Figure 12:
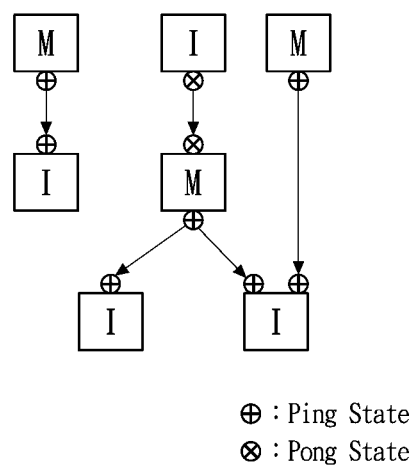
FIG. 12 shows an example of a CRTA-DDG according to another embodiment of the present invention.

Referring back to FIG. 7, the circles 701, 702, 707, 708, 709, 710, 713, 714 and 715 are all global circles. Accordingly, the circles 703, 704, 705, 706, 711 and 712 are removed. The resulting graph is shown in FIG. 8. As shown in FIG. 8, the circles 701, 707, 709 and 713 are associated to a read operation, and the circles 702, 708, 710, 714 and 715 are associated to a write operation. Accordingly, the node 801 is attached with the nodes 708 and 709, and therefore undergoes a node-splitting operation. The resulting graph is shown in FIG. 9. The graph shown in FIG. 9 can be divided into three sub-graphs G1, G2 and G3, as shown in FIG. 10, wherein the number annotating each node corresponds to the execution cycle according to the cycle information. Based on the sub-graphs shown in FIG. 10, an interference graph can be obtained, as shown in FIG. 11. As shown in FIG. 11, each node denotes a register bank and is indicated by the operation mode and the execution cycle, wherein two sub-graphs are deemed interfered if each contains a node having an overlap of an execution cycle with the other node, and both nodes contains the same read or write operation. Based on the interference graph, all of the circles in a sub-graph are allocated to either the first register bank or the second register bank. Accordingly, the circles in sub-graph G1 are allocated to the first register bank, the circles in sub-graph G2 are allocated to the second register bank, and the circles in sub-graph G3 are allocated to the first register bank. It should be noted that even though the nodes 1102 and 1106 have an overlap of an execution cycle in the second cycle, and the circles attached to the nodes 1102 and 1106 are allocated to the same register bank, since the nodes 1102 and 1106 contain different operations, they are not deemed as interfering with each other. The allocation result is shown in FIG. 12, wherein the first register bank is denoted as Ping state, and the second register bank is denoted as Pong state. When applying the prior art method, the circles in sub-graph G1 and G2 may all be allocated to the first register bank, and the circles in sub-graph G3 may be allocated to the second register bank, and therefore an overlap of execution cycle occurs. However, by applying the method in this embodiment, which further takes cycle information into account, the aforementioned overlap of execution cycle is avoided.

In step 206, all of the nodes allocated to the first functional unit and the second functional unit are partitioned into a first group assigned to the first cluster and a second group assigned to the second cluster based on the cycle information. The following describes in detail the operation of step 206. First, a plurality of sub-graphs in the graph is grouped into a plurality of groups, wherein each sub-graph in a group has overlap of execution cycles with another sub-graph in the same group. Second, the sub-graphs in a group are sorted according to the cycle lengths of each sub-graph. Third, all of the nodes in each sub-graph in the group are allocated to either the first functional unit or the second functional unit in the sorted order. The sorting and allocating steps are repeated until all of the nodes are allocated to either the first functional unit or the second functional unit.

Figure 13:
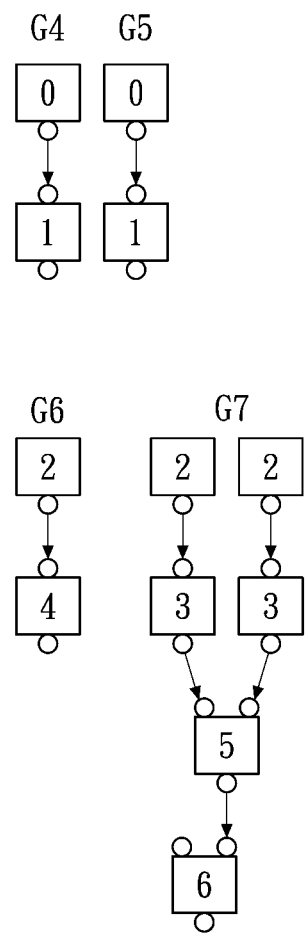
FIG. 13 shows an example of a CRTA-DDG according to another embodiment of the present invention.
Figure 14:
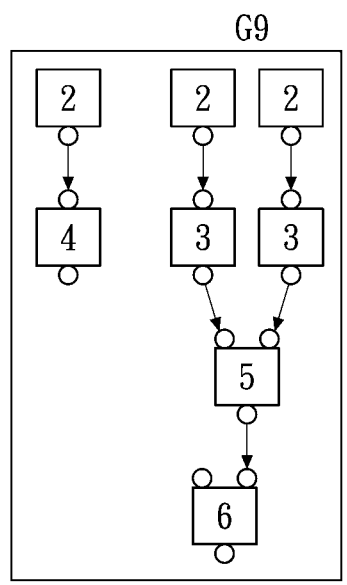
FIG. 14 shows an example of a CRTA-DDG according to another embodiment of the present invention.
Figure 15:
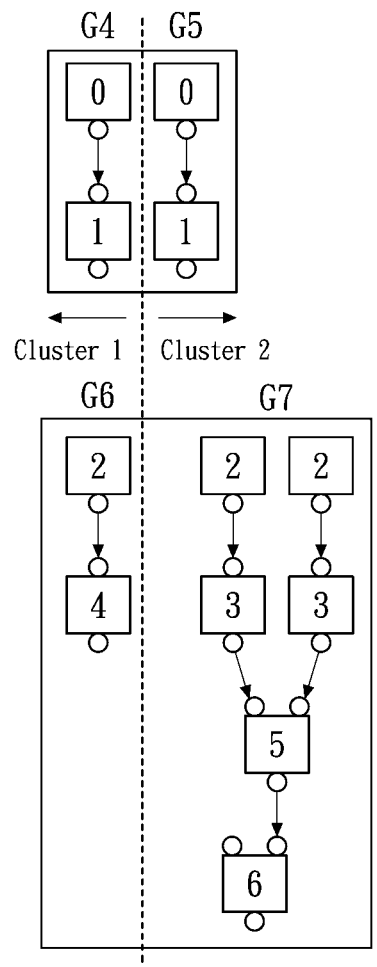
FIG. 15 shows an example of a CRTA-DDG according to another embodiment of the present invention.

FIG. 13 shows another example of a CRTA-DDG, which contains sub-graphs G4, G5, G6 and G7, wherein the number annotating each node corresponds to the execution cycle according to the cycle information. As shown in FIG. 13, the sub-graphs G4 and G5 have overlapping execution cycles. Likewise, sub-graphs G6 and G7 also have overlapping execution cycles. Accordingly, the sub-graphs G4 and G5 are grouped into a group G8, and the sub-graphs G6 and G7 are grouped into another group G9, as shown in FIG. 14. Afterward, for each group, beginning with the sub-graph with the longest cycle length, all of the nodes in each sub-graph are allocated to the first functional unit or the second functional unit. As a result, the nodes in the sub-graphs G4 and G6 are allocated to the first cluster, and the nodes in the sub-graphs G5 and G7 are allocated to the second cluster, as shown in FIG. 15.

When applying the prior art method, the nodes in sub-graphs G4, G5 and G6 may all be assigned to the first cluster, and the nodes in sub-graph G7 may be assigned to the second cluster, and therefore an overlap of execution cycle occurs. However, by applying the method in this embodiment, which further takes cycle information into account, the aforementioned overlap of execution cycle is avoided.

In step 207, at least one node is added to communicate between the first cluster and the second cluster or between the global register file and the first and second local register files. In some embodiments of the present invention, a step of performing a physical instruction scheduling operation for the plurality of instructions is carried out after step 207, and thus a physical instruction schedule accompanied by the register allocation is obtained.

In conclusion, the functional unit assignment, the register file assignment, the ping-pong register bank assignment, and the cluster assignment of the invention are performed to take full advantage of the properties of a PAC processor as well as cycle information, so as to obtain a good performance of allocating registers. Compared to the prior art method, the present invention can utilize the cycle information to provide a better solution.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for allocating registers for a processor based on cycle information, the processor comprising a first cluster and a second cluster, each cluster comprising a first functional unit, a second functional unit, a first local register file connected to the first functional unit, a second local register file connected to the second functional unit, and a global register file having a ping-pong structure formed by a first register bank and a second register bank, the global register file connected to the first and second functional units, the method comprising the steps of:

obtaining cycle information indicating latency dependencies of a plurality of instructions;

building a graph comprising nodes, circles and edges, wherein each node represents an instruction and is either unallocated or is allocated to the first functional unit or the second functional unit, each circle is attached to a node and represents an operand or the result of an instruction, and each edge is connected between two of the circles, indicating data dependency therebetween;

allocating one of the first and second functional units to the unallocated nodes in the graph according to the nodes already allocated in the path containing the nodes to be allocated and the cycle information;

allocating the first, second and global register files to the circles representing the result of an instruction based on the circles connected to the circles to be allocated and the data dependency therebetween;

allocating the first register bank and the second register bank to the circles allocated to the global register file according to the data dependency therebetween and the cycle information;

partitioning the nodes allocated to the first functional unit and the second functional unit into a first group assigned to the first cluster and a second group assigned to the second cluster based on the cycle information; and adding at least one node to communicate between the first cluster and the second cluster or between the global register file and the first and second local register files.

2. The method of claim 1, wherein the cycle information is obtained by performing a pseudo instruction scheduling operation for the plurality of instructions.

3. The method of claim 1, further comprising a step of performing a physical instruction scheduling operation for the plurality of instructions after the step of adding nodes between the global register file and the first and second local register files.

4. The method of claim 1, wherein the step of allocating the first and second functional units to the nodes comprises the sub-steps of:

finding a maximal path either containing the nodes allocated to the first functional unit and the unallocated nodes, or containing the nodes allocated to the second functional unit and the unallocated nodes, or containing only the unallocated nodes, and then removing the nodes contained in the maximal path from the graph;

repeating the finding sub-step to obtain a plurality of paths until the graph containing no nodes;

allocating the first functional units to the unallocated nodes in a path if the path contains a node allocated to the first functional unit;

allocating the second functional units to the unallocated nodes in a path if the path contains a node allocated to the second functional unit;

allocating the first functional units to the unallocated nodes in a path containing only the unallocated nodes if the execution cycles of the nodes to be allocated overlap less with the execution cycles of the nodes allocated to the first functional units;

allocating the second functional units to the unallocated nodes in a path containing only the unallocated nodes if the execution cycles of the nodes to be allocated overlap less with the execution cycles of the nodes allocated to the second functional units;

allocating the first functional units to the unallocated nodes in paths containing only the unallocated nodes if the overlap of the execution cycles of the nodes to be allocated between the nodes to be allocated and the nodes allocated to the first functional units and the overlaps of the execution cycles of the nodes to be allocated between the nodes to be allocated and the nodes allocated to the second functional units is even, and the paths of which the nodes are allocated to the second functional units are not fewer than the paths of which the nodes are allocated to the first functional units; and allocating the second functional units to the unallocated nodes in paths containing only the unallocated nodes if the overlap of the execution cycles of the nodes to be allocated between the nodes to be allocated and the nodes allocated to the first functional units and the overlaps of the execution cycles of the nodes to be allocated between the nodes to be allocated and the nodes allocated to the second functional units is even, and the paths of which the nodes are allocated to the second functional units are fewer than the paths of which the nodes are allocated to the first functional units;

wherein the overlaps of execution cycles are determined by the cycle information.

5. The method of claim 1, wherein the step of allocating the first, second and global register files to the circles comprises the sub-steps of:

allocating the global register file to each pair of the unallocated circles which are connected by an edge and are attached to a node allocated to the first functional unit and a node allocated to the second functional unit respectively;

allocating the first local register file to each pair of the unallocated circles which are connected by an edge and are both attached to a node allocated to the first functional unit; and allocating the second local register file to each pair of the unallocated circles which are connected by an edge and are both attached to a node allocated to the second functional unit.

6. The method of claim 1, wherein the processor further comprises a third functional unit connected between the first cluster and the second cluster and a third local register file connected to the third functional unit.

7. The method of claim 6, further comprising a step of allocating the third local register file to each unallocated circle attached to a node allocated to the third functional unit.

8. The method of claim 1, wherein the step of allocating the first register bank and the second register bank to the circles comprises the sub-steps of:

removing nodes, circles and edges from the graph other than global circles, which are the circles allocated to the global register file, the nodes these global circles are attached to, and the edges connecting these global circles;

performing a node-splitting operation for read and write operation in the same nodes to obtain a plurality of sub-graphs;

building an interference graph indicating data dependency and the overlaps of the execution cycles between each node according to the plurality of sub-graphs and the cycle information; and allocating the first register bank and the second register bank to the circles of the plurality of sub-graphs to avoid interference between the first register bank and the second register bank according to the interference graph;

wherein the overlaps of execution cycles are determined by the cycle information.

9. The method of claim 8, wherein two sub-graphs are deemed as interfering if each contains a node having an overlap of an execution cycle with the other node, and both nodes contains the same read or write operation.

10. The method of claim 1, wherein the step of partitioning the nodes of the first functional unit and the second functional unit comprise the sub-steps of:

grouping a plurality of sub-graphs in the graph into a plurality of groups, wherein each sub-graph in a group has overlap of execution cycles with another sub-graph in the same group;

sorting the sub-graphs in a group according to the cycle lengths of each sub-graph, and allocating all of the nodes in each sub-graph in the group to the first functional unit or the second functional unit in the sorted order; and repeating the sorting and allocating step until all of the nodes are allocated to either the first functional unit or the second functional unit;

wherein the overlaps of execution cycles are determined by the cycle information.

11. The method of claim 1, wherein the first functional unit is a load/store unit.

12. The method of claim 1, wherein the second functional unit is an arithmetic unit.

13. The method of claim 6, wherein the third functional unit is a scalar unit.

* * * * *